United States Patent Office 3,547,665
Patented Dec. 15, 1970

3,547,665
ADDITIVE FOR CONCRETE, MORTAR AND OTHER CEMENTITIOUS MIXTURES
Robert L. Johnson, Madison, Wis., assignor to Fats and Proteins Research Foundation, Inc., Des Plaines, Ill., a corporation of Illinois
No Drawing. Filed June 21, 1967, Ser. No. 647,631
Int. Cl. C04b 7/56
U.S. Cl. 106—95         14 Claims

ABSTRACT OF THE DISCLOSURE

For promoting physical strength and water-repellency in hydrated cementitious materials, a composition of matter in which a discontinuous phase comprising a fatty substance having a free fatty acid content of at least no greater than about 40% by weight is enclosed by a continuous phase comprising water, there being hydrated lime, calcium chloride and pulverulent mineral material dispersed by the water.

---

In the past, considerable effort has been devoted to developing additives for use with Portland cement in order to create or enhance certain properties of products made from this material. For example, cured concrete or mortar is known to be more durable upon exposure to the weather when it has a low propensity for absorbing moisture, and numerous materials have been introduced into cement mixtures of the described type with a view toward developing water-repellency. Among the more effective agents in this regard are fats and fatty acids. However, these substances have concomitant, adverse effects on the strength of the cured product, the former by inhibiting hydration of coated cement particles and the latter by entraining air. In addition, mechanics working with wet cement slurries prefer that the mixture be plastic or "workable" and that it remain so for a reasonable period of time before it begins to harden or set. Increasing the water content of the mixture serves this purpose but also weakens the cured product significantly. Ligno-sulfonates too have been used to promote plasticity, advantageously at reduced water levels; and while such substances have no adverse effect on strength, they likewise add no water-repellency.

It is therefore an important object of the present invention to provide compositions for adding to concrete, mortar and like cementitious mixtures which impart water-repellency without any loss of strength, which develop plasticity without the cost of an additional ingredient, and which promote a general increase in the strength of the cured product.

Another object of the invention is to provide compositions which promote physical strength and water-repellency and which may be added directly to wet cement mixtures and need not be ground into the dry cement.

These and other objects and features of the invention will become more apparent from a consideration of the following descriptions.

The objects of the invention are achieved by forming a discontinuous phase comprising organic and inorganic ingredients and by dispersing these materials in a continuous phase comprising water. The resulting compositions markedly improve both the early and the ultimate strength of cured cementitious products and, additionally, impart a desirable degree of water-repellency. Cured cementitious products which incorporate compositions in accordance with the present invention also exhibit smooth, glossy, attractive surfaces; and wet cement mixtures having the instant compositions distributed therein are lubricious and highly workable, concrete formulations filling readily into forms and block molds and troweling easily and mortar formulations spreading smoothly and adhering well to brick, tile and block surfaces.

While the composition of the invention may be prepared in various consistencies, such as in the form of a thick paste, it has proved advantageous from the standpoint of combining the compositions with wet cement mixtures to provide them as liquids of moderate viscosity. Regardless of their physical form, the compositions of the invention are prepared as hydrated dispersions; and water, in at least minimal amounts, is an essential ingredient.

A typical dispersion includes the following ingredients:

| | Parts by weight |
|---|---|
| Inedible animal fat | 2.0 |
| Water | 18.4 |
| Calcium chloride | 2.2 |
| Calcium hydroxide | 2.0 |
| Silica flour | 11.2 |
| Calcium carbonate | 1.0 |

Such a composition has been usefully employed when added to concrete and mortar mixtures at levels which have been calculated to provide from about one-quarter pound to about five pounds of the fatty substance per each one-hundred pounds of dry Portland cement.

In accordance with the invention, additive compositions are produced by mixing the selected amounts of silica flour and calcium chloride in the selected amount of water. When the calcium chloride is well dissolved in this mixture, the specified quantity of hydrated lime is added with agitation; and the selected amount of calcium carbonate is introduced. The resultant slurry is then subjected to high shearing forces, such as by means of the action of a colloid mill. Such action is continued until there is no visible evidence of small particles in the mixture; and at this point, the fatty substance is added in either solid or liquid form. Warming the fatty substance to at least about its melting point accelerates its dispersion in the slurry. Mixing in the colloid mill or its equivalent is continued until a smooth, creamy product is produced. Except for those occasions when it is desired to accelerate manufacture of the compositions by heating the fatty substance, preparation of the compositions proceeds advantageously at ambient room temperatures, thus eliminating the complexities and hazards of heated equipment. Use of high shearing forces in preparing the compositions, such as by the use of a colloid mill or its equivalent, has proved to be necessary because of a need for intimate association of the organic and inorganic particles and a need for uniform dispersion of the fatty substance and inorganic constituents in the water phase. Useful results have not been achieved by first formulating a waterless combination of the ingredients and then introducing the resultant material into dry cement, as by grinding. Cementitious products incorporating these latter materials have exhibited reduced ultimate strength compared with control products having no admixture. Furthermore, a rancid odor has been noted in cured products so formulated, even though no such undesirable odors are present in products incorporating compositions made in compliance with the present invention.

Another advantageous method of producing the additive compositions of the invention involves first dissolving the fatty substance in a suitable organic solvent, such as toluene or mineral spirits. To this solution is added the silica flour, lime and calcium carbonate, sufficient mild agitation being employed to achieve blending of the ingredients. The calcium chloride and water are separately mixed to dissolve the salt, and this solution is then added slowly with mild agitation to the previously described mixture. A very creamy, homogeneous product results.

The relative amounts of organic solvent and water can be varied. However, the proper relative amounts have been found to depend somewhat on the free fatty acid content of the fatty substance. Where the free fatty acid level is relatively higher, a higher proportion of organic solvent is required; and where the free fatty acid content is relatively lower, a higher proportion of water should be used. In addition, there is considerable latitude in the ratio of solids to solvents; and eminently useful compositions have been made with a total solvents content amounting to approximately 30% of the solids present. An important advantage of the compositions incorporating an organic solvent resides in their generally reduced water content and their corresponding lower cost to handle and transport.

Regardless of the procedure used in making the compositions of the invention, they are easily and quickly dispersed in a concrete or mortar mix, being readily incorporated in the hydrating water itself.

In compliance with the invention, the fatty substance is conveniently a mixture of monoglycerides, diglycerides and triglycerides in which mixture there is, additionally, a quantity of one or more fatty acids in the uncombined state. The free fatty acids are selected to be present in an amount not exceeding about 40% by weight of the total fatty substance and preferably between about 15% and about 25% thereof. At these levels, no significant air entrainment has been observed in concrete formulated using the compositions of the invention. While no specific experiments have been conducted, it is believed that the uncombined fatty acid content promotes dispersion of the glycerides in the composition and, in turn, the composition itself in a cement slurry. Presence of the described fatty substance in the instant compositions promotes water-repellency in cementitious materials formulated therewith and adds ultimate strength to the cured units. While the exact mechanism is not presently known, it is believed that this additional strength is a result of the glycerides reducing the rate of water emigration from the curing mixture and thereby promoting greater strength by fostering more complete hydration of the cement.

Specific fatty substances which have proved useful in the practice of the present invention include such inedible animal fats as Choice White Grease, No. 1 Dark Tallow and No. 2 Dark Tallow. Fatty substances of vegetable origin also may be employed; and crude, non-degummed soybean oil has exhibited utility in the practice of the invention. Other useful vegetable oils include linseed oil and corn oil. In addition, marine oils, such as those derived from the processing of herring, sperm whales and codfish, may be employed in place of the described fatty substances of animal and vegetable origin. Tallows are preferred in the practice of the present invention because they contain an advantageous fraction of uncombined fatty acids, on the order of 15-20% of such fatty acids.

Water is included in the present compositions as a dispersant and as a vehicle to serve as the continuous phase. It is also believed that the water present may combine with certain of the other ingredients, as by hydration, because it has been observed that the instant compositions oftentimes thicken slightly on aging.

Calcium chloride is included as a preservative for the fatty substance, as an inhibitor of algal growth and as a promoter of cement hydration. In compliance with the principles of the present invention, the calcium chloride is incorporated in an amount of at least about 5% by weight of the discontinuous or dispersed phase and, in general, between about 5% and about 65% by weight thereof. Compositions incorporating calcium chloride at the higher levels have been found to display an adverse effect on the ultimate strength of cured cementitious products. However, it has been found that such adverse effects may be ameliorated by using somewhat higher proportions of hydrated lime or by introducing a known set inhibitor such as sucrose or sodium nitrite.

Hydrated lime is included in the present compositions at levels not to exceed about 45% by weight of the dispersed phase and, in general, between about 5% and about 45% by weight thereof. At these levels, the hydrated lime promotes gelling and maintains the fatty substance and silica flour, or other pulverulent mineral matter, in suspension. At the described levels, there is insufficient alkali present in the compositions to saponify the glycerides of the fatty substance to any significant extent, compositions of the invention displaying alkalinities on the order of about 11 to about 13 points on the pH scale. The higher levels of hydrated lime, when associated with the lower levels of calcium chloride have been found to be associated with less than optimum ultimate strength in cured cementitious products.

Specific materials which may serve as the hydrated lime of the instant compositions include the hydrated material sold commercially as masonry lime. Dolomitic limestone of suitable fineness may also be employed even though it contains magnesium hydroxide in addition to calcium hydroxide. However, neither anhydride nor quick lime may be used unless first slaked.

The particle size of the pulverulent mineral matter is important to the effectiveness of the instant compositions for their intended purpose. Pulverulent mineral matter having a fineness of at least about 140 mesh and finer have proved eminently useful in this regard whereas 80 mesh material has been found to be of marginal utility and coarser grades unsatisfactory. The pulverulent mineral matter should also be present in an amount of at least about 25% by weight of the discontinuous phase for optimum utility of the compositions; and various products may be usefully employed as the pulverulent mineral component. Suitable grades of commercial silica flour, containing approximately 90% or more by weight of pure silicon dioxide, have proved to be particularly useful in the practice of the invention. Other suitable substances include talc, powdered clays such as kaolin, mica dust and diatomaceous earth. While the pulverulent, siliceous mineral material of the invention may serve as a source of supplemental silicates, its primary function in the instant compositions is believed to be physical rather than chemical.

Calcium carbonate may be employed as an optional ingredient in the instant compositions, and this material appears to serve some effect as a stabilizer for the dispersed phase. Other alkali metal and alkaline earth carbonates may also be included.

In order to describe the invention more fully, several illustrative examples are given hereinafter but without in any way limiting the invention thereto.

EXAMPLE I

|  | Parts by weight |
|---|---|
| Animal fat (Choice White Grease) | 2.0 |
| Water | 25.0 |
| Calcium chloride | 2.2 |
| Calcium hydroxide | 2.0 |
| Silica flour | 11.2 |
| Calcium carbonate | 1.0 |

The composition of this example was prepared by adding the inorganic components to the water and blending until dissolved and dispersed. The sequence of steps involved first mixing the calcium chloride, silica flour and water until the chloride was dissolved. The calcium hydroxide was then added with blending; and finally, the calcium carbonate was added with further blending using a colloid mill. After addition of the carbonate, the mixture was worked until visually smooth and homogeneous. At that point, the animal fat was added and forcible mixing continued until a smooth creamy product was achieved.

In order to establish the utility of the composition of this example, tests were performed using mortar made by mixing portland cement and Ottawa silica sand in a weight ratio of 1:3 and employing a water:cement ratio of 1:2. The composition of the invention was added to the tempering water at a level to incorporate two pounds of animal fat per each one-hundred pounds of portland cement, and the water content of the additive composition was included in calculating the overall water:cement ratio. Tempering water was introduced at about 60° F., and a standard mixing cycle was employed. Test specimens measuring 2″ x 12″ were cast from the resultant mixture, and the loaded molds were placed in a humid chamber for twenty-four hours. The specimens were then unloaded from the molds and allowed to cure at room temperature averaging about 70° F. and at constant humidity. Compressive strengths of specimens made in accordance with the invention, as compared with specimens of the mortar mixture alone and with the mortar mixture including the composition of the invention omitting animal fat, are set forth in Table I below. Remarkable improvements in both early and ultimate strength are shown in the data of this table.

TABLE I

| Time after pouring specimen | Compressive strength (p.s.i.) | | |
|---|---|---|---|
| | Cement/sand mortar with admixture of Example I | Cement/sand mortar with admixture omitting animal fat | Cement/sand mortar alone |
| 1 day | 1,460 | 2,050 | 725 |
| 3 days | 3,070 | 3,555 | 1,510 |
| 7 days | 3,500 | | 2,400 |
| 28 days | 3,765 | 3,555 | 2,550 |

EXAMPLES II–IV

The compositions of these examples were formulated from the same ingredients in the same proportions using the same procedures and equipment as the composition of Example I, except that the type of fatty substance was varied as follows:

Example II—crude, non-degummed soybean oil
Example III—No. 1 Dark Tallow
Example IV—No. 2 Dark Tallow The compositions of Examples II–IV were incorporated in mortar mixtures as described with respect to Example I, and the resulting test specimens were examined for water-repellency by the following procedure: After curing for twenty-four hours, the samples were weighed and then submerged in a tank under eight feet of water (approximately 3.6 p.s.i.). After various intervals of time, the samples were removed, rolled in a towel to remove surface water and immediately weighed, the resulting data being set forth in Table II.

TABLE II

| Composition | Initial weight, gms. | Weight increase, gms. | | | | |
|---|---|---|---|---|---|---|
| | | 6 hr. | 24 hr. | 48 hr. | 72 hr. | Total |
| Example I | 263.7 | 2.9 | 0.9 | 0.8 | 0.2 | 4.8 |
| Example II | 265.3 | 3.2 | 0.7 | 0.5 | 0.4 | 4.8 |
| Example III | 277.8 | 3.3 | 0.9 | 0.6 | 0.2 | 5.0 |
| Example IV | 262.8 | 3.4 | 0.9 | 0.6 | 0.3 | 5.2 |
| None | 279.3 | 12.6 | 0.5 | 0.3 | 0.1 | 13.5 |

The above data shows that mortar specimens incorporating compositions of the invention have a high degree of water repellency when compared with a similar mortar specimen containing no such composition.

EXAMPLES V–VII

| | Parts by Weight | | |
|---|---|---|---|
| | Ex. V | Ex. VI | Ex. VII |
| Animal fat (No. 2 Dark Tallow) | 2.0 | 2.0 | 2.0 |
| Water | 18.4 | 18.4 | 18.4 |
| Calcium chloride | 2.2 | 1.8 | 4.4 |
| Calcium hydroxide | 2.0 | 2.6 | 5.0 |
| Silica flour | 11.2 | 11.2 | 6.0 |
| Calcium carbonate | 1.0 | 1.0 | |

The composition of Example V differs from that of Example IV in two respects, namely, the water content was reduced and the proportion of free fatty acid in the animal fat was 39% in the material of Example V whereas it was only 17% in the tallow of Example IV. The compositions of Examples V–VII were prepared in accordance with the procedure described with respect to Example I and were incorporated in cement/sand mortar in the same manner as described with respect to Example I.

One group of specimens so produced was tested after one-day's cure, and another group after 90 days' cure. The former group was examined for compressive strength as removed from the molds whereas the second group was tested for compressive strength after having been first soaked in water for twenty-four hours, being stressed in the wet state. The data collected is set forth in Table III where it should be noted that the samples including compositions of the invention are remarkably stronger and more water-repellent than the control samples without such admixture. Comparing the data in Table III shows a trend for slightly decreasing strength with increasing calcium chloride content within the range examined. These data also indicate samples including compositions having a lower level of silica flour are associated with somewhat improved water-repellency.

TABLE III

| Admixture | One day cure | | 90-day cure | |
|---|---|---|---|---|
| | Wht., gms. | Strength, p.s.i. | Wht. increase (24 hour soak), gms. | Strength, p.s.i. |
| None | 287 | 1,125 | 8.6 | 3,100 |
| Example V | 280 | 2,165 | 2.4 | 5,590 |
| Example VI | 282 | 2,195 | 2.3 | 5,635 |
| Example VII | 282 | 2,175 | 1.9 | 5,260 |

In order to establish the effect of the instant compositions on the bond strength between portland cement particles and the aggregate, mortar specimens were prepared as previously described incorporating the compositions of Examples I and IV, tensile testing being conducted after samples were cured by air drying for twenty-eight days. The data developed is set forth in Table IV.

TABLE IV

Admixture: Tensile strength
   None _____ p.s.i._ 415
   Example I _____ 475
   Example IV _____ 635

While mortar specimens incorporating compositions in accordance with the present invention exhibit greater tensile strength in the above data than the corresponding mortar prepared with no admixture, it is important to observe that compositions based on No. 2 Dark Tallow show a remarkably greater increase in tensile strength than compositions based on Choice White Grease.

EXAMPLE VIII

Parts by weight
Animal fat (No. 2 Dark Tallow) _____ 20
Toluene _____ 10
Calcium chloride _____ 10
Water _____ 20
Calcium hydroxide _____ 5
Silica flour _____ 30
Calcium carbonate _____ 1

The composition of Example VIII was prepared by first dissolving the tallow in the toluene; and to this solution, there was added the silica flour, calcium hydroxide and calcium carbonate. Mild agitation was employed in order to blend the ingredients. The calcium chloride and water were mixed in a separate tank; and when the salt was dissolved, this latter solution was added slowly with continued agitation to the first mixture. A product of creamy consistency resulted. A cement/sand mortar was prepared as described with respect to Example I, and the composition of Example VIII was added thereto, in the tempering water, in sufficient amount to give one pound of tallow for each one-hundred pounds of Portland cement. The wet mixture was poured into test molds as previously described; and after twenty-four hours in the mold, the test specimens were removed and air dried. Compressive strengths were measured periodically. After three days, the compressive strength measured 2710 p.s.i., after seven days 3570 p.s.i., and after twenty-eight days 5500 p.s.i.

EXAMPLE IX

| | Parts by weight |
|---|---|
| Animal fat (Choice White Grease) | 2.0 |
| Water | 18.4 |
| Calcium chloride | 2.2 |
| Calcium hydroxide | 2.0 |
| Kaolin clay | 11.2 |
| Calcium carbonate | 1.0 |

The composition of Example IX was formulated using the procedure of Example I, and cement mortar specimens were prepared in the manner previously described with respect to Example I. Compressive strength of test specimens was in excess of 3700 p.s.i. after twenty-eight days of air drying. Water absorption as determined by weight increase in accordance with the procedure set forth relative to Examples II–IV was less than 2% as compared with nearly 5% for control specimens omitting the composition of the invention.

EXAMPLE X

| | Parts by weight |
|---|---|
| Animal fat (Choice White Grease) | 2.0 |
| Water | 18.4 |
| Calcium chloride | 2.2 |
| Calcium hydroxide | 2.0 |
| Mica dust | 11.2 |
| Calcium carbonate | 1.0 |

The composition of Example X was prepared in accordance with the method described with respect to Example I, and compressive strengths of cement/sand mortar specimens were found to be in excess of 3600 p.s.i. at the end of twenty-eight days curing in ambient air.

While particular embodiments of the invention have been described, it should be understood, of course, that the invention is not limited thereto since many modifications may be made. It is contemplated to cover by the present application any such modifications as fall within the spirit and scope of the appended claims.

The invention is claimed as follows:

1. A composition for promoting physical strength and water-repellency in a hydrated portland cement material, said composition consisting essentially of an oil-in-water emulsion having a discontinuous, oil phase comprising a mixture of biologically occurring glycerides and uncombined fatty acid, said fatty acid being present in an amount sufficient to enhance physical strength and water-repellency in said portland cement material and no greater than about 40% by weight of said mixture, and a continuous phase comprising sufficient water to enclose said discontinuous phase, said emulsion including hydrated lime in an amount not exceeding about 45% by weight of said discontinuous phase, calcium chloride in an amount of at least about 5% by weight of said discontinuous phase, and pulverulent mineral matter selected from the group consisting of silica flour, talc, powdered clays, mica dust and diatomaceous earth and having a fineness of at least about 140 mesh and being present in an amount of at least about 25% by weight of said discontinuous phase, said water dispersing said hydrated lime, said calcium chloride, said pulverulent mineral matter and said mixture.

2. A composition according to claim 1 wherein said fatty acid is present in an amount of from about 15% to about 25% by weight of said mixture.

3. A composition according to claim 1 wherein said discontinuous phase further comprises calcium carbonate.

4. A composition according to claim 1 wherein said mixture is tallow.

5. A composition according to claim 1 wherein said mixture is soybean oil.

6. A composition according to claim 1 wherein said mixture is inedible animal fat.

7. A composition according to claim 1 wherein said discontinuous phase further comprises an organic solvent for said mixture.

8. A composition according to claim 7 wherein said solvent is toluene.

9. A composition according to claim 7 wherein said solvent is mineral spirits.

10. A composition according to claim 1 wherein said lime is present in an amount of from about 5% to about 45% by weight of said discontinuous phase.

11. A composition according to claim 1 wherein said calcium chloride is present in an amount of from about 5% to about 65% by weight of said discontinuous phase.

12. A cementitious product comprising portland cement and the composition of claim 1 in an amount added to provide from about one-quarter pound to about five pounds of the fatty mixture contained therein per each one-hundred pounds of dry portland cement.

13. The method of making the composition of claim 1 comprising the steps of: mixing the amounts of water, calcium chloride, lime and pulvurulent mineral matter to dissolve the lime and calcium chloride and disperse the mineral matter; subjecting the resulting slurry to high shearing forces to produce a smooth, uniform mixture; adding the mixture to said last mentioned mixture in continuation of said high shearing forces.

14. The method of making the composition of claim 7 comprising the steps of: dissolving the mixture in the organic solvent; adding the pulverulent mineral matter and lime to the resultant solution with agitation; separately dissolving the calcium chloride in the water; adding the latter mixture to the former mixture with agitation.

References Cited

UNITED STATES PATENTS

| 3,366,502 | 1/1968 | Lombardo | 106—314 |
| 3,097,955 | 7/1963 | Harris | 106—95 |
| 2,878,875 | 3/1959 | Dunlap | 106—90 |
| 2,211,140 | 8/1940 | Licata | 106—95 |
| 1,221,445 | 4/1917 | Harrison | 106—314 |
| 976,520 | 11/1910 | Toch | 106—95 |
| 3,008,843 | 11/1961 | Jolly | 106—95 |

OTHER REFERENCES

Lea and Desch, "The Chemistry of Cement and Concrete," pp. 518–21 (1956).

Day and Joullie, "Organic Chemistry," p. 542 (1960).

TOBIAS E. LEVOW, Primary Examiner

W. T. SCOTT, Assistant Examiner

U.S. Cl. X.R.

106—90, 314